(12) United States Patent
Yahagi (10) Patent No.: US 8,705,446 B2
(45) Date of Patent: Apr. 22, 2014

(54) COMMUNICATION SYSTEM, BASE STATION, MOBILE STATION, RETRANSMISSION CONTROL METHOD, AND RETRANSMISSION PROGRAM

(75) Inventor: Junichi Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 805 days.

(21) Appl. No.: 12/922,048

(22) PCT Filed: Mar. 10, 2009

(86) PCT No.: PCT/JP2009/054979
§ 371 (c)(1),
(2), (4) Date: Sep. 10, 2010

(87) PCT Pub. No.: WO2009/116474
PCT Pub. Date: Sep. 24, 2009

(65) Prior Publication Data
US 2011/0013565 A1    Jan. 20, 2011

(30) Foreign Application Priority Data
Mar. 17, 2008    (JP) .................................. 2008-068406

(51) Int. Cl.
*H04W 4/00* (2009.01)

(52) U.S. Cl.
USPC .......... 370/328; 370/310; 370/342; 370/345; 370/347

(58) Field of Classification Search
None
See application file for complete search history.

(56) References Cited

U.S. PATENT DOCUMENTS

| 2006/0146889 A1* | 7/2006 | Malkamaki et al. | 370/506 |
| 2007/0047437 A1* | 3/2007 | Bachl et al. | 370/229 |
| 2008/0002617 A1* | 1/2008 | Peisa et al. | 370/329 |

FOREIGN PATENT DOCUMENTS

| CN | 1878050 A | 12/2006 |
| CN | 101095304 A | 12/2007 |
| JP | 2004032640 A | 1/2004 |
| JP | 2006191312 A | 7/2006 |
| JP | 2006222494 A | 8/2006 |
| JP | 2006245838 A | 9/2006 |
| JP | 2007082192 A | 3/2007 |

(Continued)

OTHER PUBLICATIONS

Chinese Office Action for CN200980109568.4 dated Oct. 10, 2012.

(Continued)

*Primary Examiner* — Hassan Phillips
*Assistant Examiner* — Gautam Sharma
(74) *Attorney, Agent, or Firm* — Sughrue Mion, PLLC (57) ABSTRACT

A communication system which can immediately retransmit data under a condition that it cannot specify number of retransmissions, characterizing in that a mobile station comprises a first transmission unit for transmitting the data through a first physical channel, a first reception unit for receiving a decoded result through a second physical channel from a base station, and a second transmission unit for generating a first control information based on a decoded result and transmitting a first control information through a third physical channel, and a base station comprises a second reception unit for receiving the data, a third transmission unit for decoding the data in the physical layer and transmitting the decoded result through the second physical channel, and a third reception unit for receiving the first control information through the third physical channel, wherein the third transmission unit transmits the second control information through the second physical channel to the mobile station in order to retransmit the data from the beginning in a case when it cannot specify number of the retransmissions from the first control information.

11 Claims, 7 Drawing Sheets

(56) References Cited

FOREIGN PATENT DOCUMENTS

| | | |
|---|---|---|
| JP | 3913259 B | 5/2007 |
| JP | 2007129673 A | 5/2007 |
| WO | 2006101347 A | 9/2006 |
| WO | 2006101347 A1 | 9/2006 |
| WO | 2007024559 A | 3/2007 |
| WO | 2007024559 A1 | 3/2007 |

OTHER PUBLICATIONS

International Search Report for PCT/JP2009/054979 mailed Apr. 21, 2009.

3GPP TS 25.214 V6.11.0, Technical Specification Group Radio Access Network; Physical layer procedures (FDD) (Release 6), Dec. 2006.

3GPP TS 25.214 V7.7.0, Technical Specification Group Radio Access Network; Physical layer procedures (FDD) (Release 7), Nov. 2007.

3GPP TS 25.212 V6.10.0, Technical Specification Group Radio Access Network; Multiplexing and channel coding (FDD) (Release 6), Dec. 2006.

3GPP TS 25.212 V7.7.0, Technical Specification Group Radio Access Network; Multiplexing and channel coding (FDD) (Release 7), Nov. 2007.

* cited by examiner

| SUB-FRAME NUMBER | PATTERN 1 | PATTERN 2 |
|---|---|---|
| 0 | INFORMATION ELEMENT A | INFORMATION ELEMENT A |
| 1 | INFORMATION ELEMENT B | INFORMATION ELEMENT B |
| 2 | INFORMATION ELEMENT B | INFORMATION ELEMENT A |
| 3 | INFORMATION ELEMENT A | INFORMATION ELEMENT A |
| 4 | INFORMATION ELEMENT B | INFORMATION ELEMENT B |

Fig. 7

COMMUNICATION SYSTEM, BASE STATION, MOBILE STATION, RETRANSMISSION CONTROL METHOD, AND RETRANSMISSION PROGRAM

This application is the National Phase of PCT/JP2009/054979, filed Mar. 10, 2009, which claims priority from Japanese Patent Application No. 2008-068406, filed on Mar. 17, 2008, the contents of which are incorporated herein by the reference in their entirety.

TECHNICAL FIELD

The present invention relates to a mobile communication system and, in particular, relates to a decoding and a retransmission control method in the system.

BACKGROUND ART

In recent years, a HSUPA (High Speed Uplink Packet Access) is standardized as a high-speed packet data transmission method for up link, and application to a W-CDMA (Wide band-Code Division Multiple Access) system is under consideration. A HARQ (Hybrid Automatic Repeat reQuest) is adopted in a HSUPA, and minimum delay and high throughput are achieved by a high-speed retransmission control. The HARQ is a technology that improves an error correcting capability at the time of retransmission by combining an ARQ (Automatic Repeat reQuest) and an error correcting code. Further, the HARQ synthesizes decoded failed-data and re-transmitted data, and executes a decoding process.

A physical channel by which an E-DCH (Enhanced Dedicated Channel), that is a transport channel in the HSUPA, is mapped is an E-DPDCH (Enhanced Dedicated Physical Data Channel). The E-DPDCH is used with an E-DPCCH (Enhanced Dedicated Physical Control Channel) which is a control channel for transmitting control information on a physical layer. And, 2 ms and 10 ms are specified as an E-DCH TTI (Transmission Time Interval).

A RSN (Retransmission Sequence Number) which is information indicating number of retransmissions required for the HARQ is transmitted on the E-DPCCH. The RSN is composed of 2 bits and from "0" to "2" indicates number of the retransmissions, and "3" indicates that number of the retransmissions is no smaller than three (3 times). In other words, when the RSN is any one of "0", "1", and "2", it can specify number of the retransmissions. However, when RSN equals 3, it cannot specify actual number of the retransmissions.

In addition, an acknowledgement message (Acknowledgement) is transmitted after signature multiplexed by an E-HICH (E-DCH Hybrid ARQ Indicator Channel). When the TTI equals 10 ms, the acknowledgement messages are transmitted in total of 5 times for every 2 ms (every sub-frame) on the E-HICH.

On the other hand, when it performs a handover by a different frequency carrier between the same communication systems or different communication systems, a mobile station receives signals of other frequencies during the communication. And the mobile station needs to measure a required signal level and to receive required control information in order to change a communicating base station.

In the W-CDMA system, transmission information of the usual mode is transmitted in a short period by time-compressing and a non-transmitting gap (GAP) is created. And the W-CDMA system has a compressed mode where other frequency carriers are monitored by using the GAP. The W-CDMA system monitors information from the base stations which belong to the same cell and to its adjacent cells by using the compressed mode.

Figure 1:
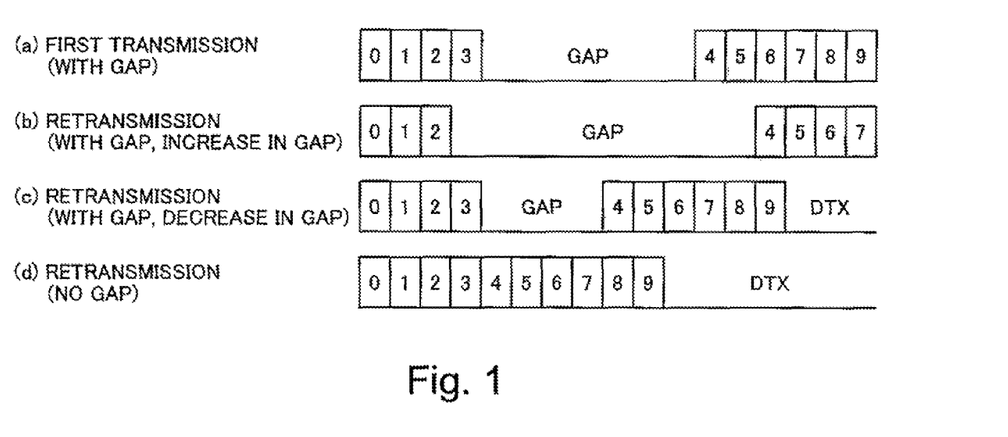
FIG. 1 is a conceptual diagram showing a transmission status of retransmitted data on an E-DPDCH whose TTI equals 10 ms during a compressed mode.

FIG. 1 is a conceptual diagram showing a transmission status of the re-transmitted data of the E-DPDCH in a case that the TTI equals 10 ms during the compressed mode. Numbers "0", "1", "2", and others described in FIG. 1 are serial numbers that are assigned to time slots of transmitted data. In the HSUPA, the mobile station should not transmit any data during the compressed mode is initiating and also at a section that is overlapping with GAP, when the TTI equals 2 ms. In a case that the TTI equals 10 ms and the compressed mode is overlapping with GAP at an initial transmission, the mobile station transmits using a time slot which does not overlap with the GAP as shown in FIG. 1(a).

In addition, at a retransmission, the mobile station transmits using a time slot which is not overlapped with the GAP at a current transmission section as shown in FIGS. 1(b), (c) and (d). When available time slots are more than the time slots for the initial transmission, then the excess time slots are set as DTX (Discontinuous Transmission) as shown in FIGS. 1(c) and (d). When available time slots are less than the time slots for the initial transmission, then it does not transmit the data of the insufficient time slot as shown in FIG. 1(b).

Then, some technical literatures in relation to the above-mentioned descriptions are explained as follows. The following (1) to (4) are conventional standards that relate to the data retransmission of the E-DPDCH which has been described above.

(1) 3GPP TS25.214 V6.11.0 (2006 December)
(2) 3GPP TS25.214 V7.7.0 (2007 November)
(3) 3GPP TS25.212 V6.10.0 (2006 December)
(4) 3GPP TS25.212 V7.7.0 (2007 November)

In addition, a Japanese Patent Application Laid-Open No. 2004-032640 discloses a technological example of reducing number of retransmissions at a time of handover. A Japanese Patent Application Laid-Open No. 2006-191312 discloses a technological example of detecting packet losses while initiating the compressed mode and executing the retransmission and other processes. A Japanese Patent Application Laid-Open No. 2006-222494 discloses a technological example of transmitting dummy ACK in order to start a retransmission control.

A Japanese Patent Application Laid-Open No. 2006-245838 discloses a technological example of signature multiplexing and transmitting information to the mobile station. A Japanese Patent Application Laid-Open No. 2007-082192 discloses a technological example of retransmitting a packet in a case that the E-DCH TTI equals 10 ms. A Japanese Patent Application Laid-Open No. 2007-129673 discloses a technological example of retransmitting missing packets when packets are not precisely combined. A Japanese Patent Publication No. 3913259 discloses a technological example of transmitting a plurality of data using an exclusive signature number on an independent channel.

DISCLOSURE OF THE INVENTION

When the E-DPCCH could not be detected continuously, a decoding of RSN is failed, or just after the radio link was added by the handover, the base station may start a reception from the E-DPCCH/E-DPDCH whose RSN equals 3.

In this case, following to the above-mentioned technologies indicated in (1) to (4), the base station cannot specify number of the retransmission. Therefore, when the compressed mode is initiated and TTI equals 10 ms, it is hard to execute the decoding process because it cannot specify a GAP pattern at an initial transmission.

In such a case, the mobile station continues wasteful retransmissions up to a maximum number of retransmissions that is specified by a higher layer. It will also increase the delay of not only the data but also another data, and wait for the retransmission of the data from the higher layer. Therefore, it causes further delay and declines a throughput.

There is also a method of assuming a GAP pattern at an initial transmitting and executing the decoding process. However, it cannot settle the issue in a method of assuming a fixed GAP pattern when an assumption is incorrect. In a method of assuming the GAP pattern dynamically, it cannot synthesize decoded failed-data and the retransmitted data. As a result, since an error correcting capability declines seriously, it is hard to avoid increase of delay due to increase in number of the retransmissions and decline of throughput.

In this connection, technologies of the above-mentioned Japanese Patent Application Laid-Open No. 2004-032640, the Japanese Patent Application Laid-Open No. 2006-191312, the Japanese Patent Application Laid-Open No. 2006-222494, the Japanese Patent Application Laid-Open No. 2006-245838, the Japanese Patent Application Laid-Open No. 2007-082192, the Japanese Patent Application Laid-Open No. 2007-129673, and the Japanese Patent Publication No. 3913259 discloses methods in detail about the detection of the packet losses and the data retransmissions. However, none of the above documents refer to specific issues in the above-mentioned HSUPA. Moreover, these documents did not show a method of settling in detail of retransmitting data after detecting an occurrence of the issue.

The object of the present invention is to provide a communication system, a base station, a mobile station, a retransmission control method, and a retransmission program that can immediately retransmit data under a condition that number of retransmissions cannot be specified.

In order to achieve the above-mentioned object, a wireless communication system according to the present invention performing wireless communication between mobile stations and base stations comprising, the mobile station comprising a first transmission unit for transmitting data through a first physical channel, a first reception unit for receiving a decoded result through a second physical channel from the base station, and a second transmission unit for generating a first control information based on the decoded result and transmitting the first control information through a third physical channel, and the base station comprising a second reception unit for receiving the data, a third transmission unit for decoding the data in a physical layer and transmitting the decoded result through the second physical channel, a third reception unit for receiving the first control information through the third physical channel, and a fourth transmission unit for transmitting the second control information through the second physical channel to the mobile station in order to retransmit the data from beginning in a case when it cannot specify number of the retransmissions from the first control information.

Further, in order to achieve the above-mentioned object, the base station according to the present invention is a base station that performs wireless communication with the mobile station, comprising a first reception unit for receiving a predetermined data from the mobile station through the first physical channel, a first transmission unit for decoding the data in a physical layer and transmitting the decoded result through the second physical channel, a second reception unit for receiving the first control information that is generated based on the decoded result through the third physical channel, and a second transmission unit for transmitting the second control information through the second physical channel to the mobile station in order to retransmit the data from the beginning in a case when it cannot specify number of the retransmissions from the first control information.

Further, in order to achieve the above-mentioned object, the mobile station according to the present invention is the mobile station that performs wireless communication with the base station, comprising a first transmission unit for transmitting the data through the first physical channel, a first reception unit for receiving the decoded result in the physical layer of the data through the second physical channel, a second transmission unit for generating the first control information based on the decoded result and transmitting the first control information through the third physical channel, and a second reception unit for receiving the second control information through the second physical channel in order to retransmit the data from the beginning according to the first control information, wherein the second transmission unit retransmits the data from the initial transmission when it receives the second control information.

Further, in order to achieve the above-mentioned object, a retransmission control method according to the present invention is a retransmission control method of the wireless communication system which performs the wireless communication between the mobile station and the base station, comprising a first transmission step to which the mobile station transmits the data through the first physical channel, a first reception step by which the base station receives the data, a second transmission step which decodes the data in the physical layer and transmits the decoded result through the second physical channel, a second reception step by which the mobile station receives the decoded result through the second physical channel, a third transmission step which generates the first control information based on the decoded result and transmits the first control information through the third physical channel, a third reception step by which the base station receives the first control information through the third physical channel, a fourth transmission step which transmits the second control information through the second physical channel to the mobile station in order to retransmit the data from the beginning in a case when it cannot specify number of the retransmissions from the first control information, and a fourth reception step by which the mobile station receives the second control information through the second physical channel.

Further, in order to achieve the above-mentioned object, a retransmission control program according to the present invention in the wireless communication system with which the mobile station and the base station performs wireless communication which is executed by a computer that controls the base station, comprising a first reception process for receiving the predetermined data from the mobile station through the first physical channel, a first transmission process for decoding the data in the physical layer and transmitting the decoded result through the second physical channel, a second reception process for receiving the first control information that is generated based on the decoded result through the third physical channel, and a second transmission process for transmitting the second control information through the second physical channel to the mobile station in order to retransmit the data from the beginning in a case when it cannot specify number of the retransmissions from the first control information.

Further, in order to achieve the above-mentioned object, another retransmission control program according to the present invention in the wireless communication system with which the mobile station and the base station perform wireless communication which is executed by a computer that controls the base station, comprising a first transmission process for transmitting the data through the first physical channel, a first reception process for receiving the decoded result in the physical layer of the data through the second physical channel, a second transmission process for generating the first control information based on the decoded result and transmitting the first control information through the third physical channel, a second reception process for receiving the second control information in order to retransmit the data from the beginning through the second physical channel according to the first control information, and a third process for retransmitting the data by the second transmission unit from the initial transmission in a case when the second control information is received.

Because the present invention is composed so that the mobile station can retransmit from the beginning when specific conditions are satisfied, it is possible to finish wasteful retransmissions and restart the data transmission from the beginning. As a result, it can provide excellent communication systems, base stations, mobile stations, retransmission control methods, and retransmission programs over existing ones wherein data are retransmitted immediately under a condition that it cannot specify any more number of the retransmissions.

BEST MODE FOR CARRYING OUT THE INVENTION

First Embodiment

Figure 7:
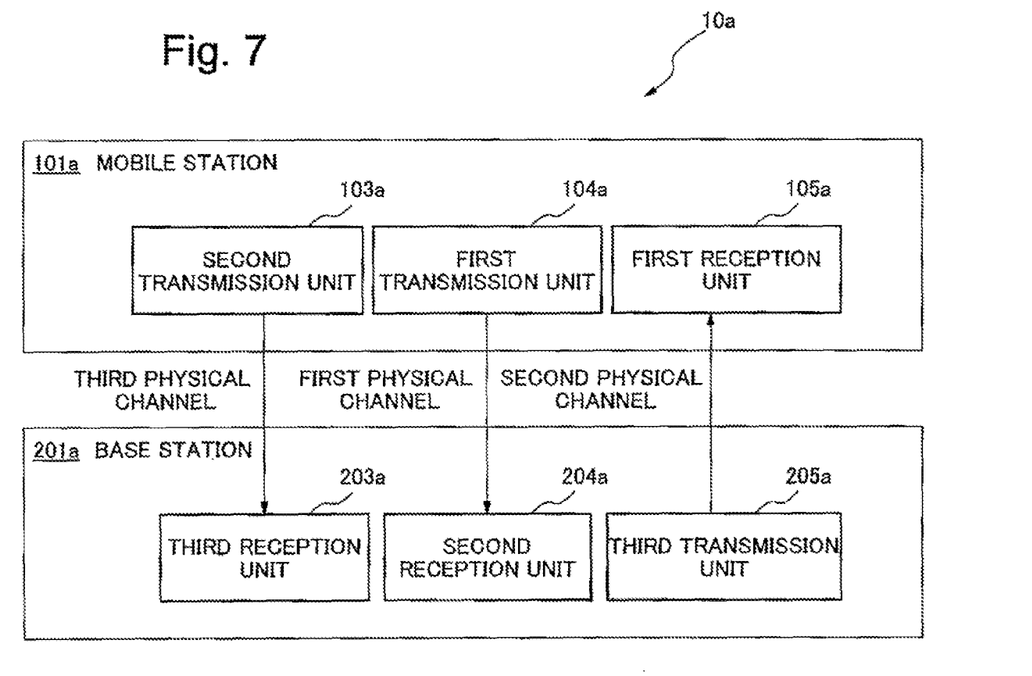
FIG. 7 is a block diagram showing a general functional composition of the wireless communication system according to the first embodiment of the present invention.

FIG. 7 is a block diagram showing a general functional composition according to the first embodiment. A wireless communication system 10a performs a wireless communications between a mobile station 101a and a base station 201a. The mobile station 101a includes a first transmission unit 104a, a second transmission unit 103a and a first reception unit 105a. Further, the base station 201a includes a second reception unit 204a, a third reception unit 203a and a third transmission unit 205a.

And, data are sent from the first transmission unit 104a to the second reception unit 204a through a first physical channel. Further, first control information is sent from the third transmission unit 205a to the first reception unit 105a through a second physical channel. Further, second control information is sent from the second transmission unit 103a to the third reception unit 203a through a third physical channel.

Here, the mobile station 101a generates the first control information based on a decoded result. In addition, the base station 201a decodes the data at the physical layer and receives the first control information, and transmits the second control information to the mobile station in order to retransmit the data from the beginning in a case when it cannot specify number of the retransmissions from the first control information.

In this way, according to the embodiment, under a condition that it cannot specify number of the retransmissions, it can provide the wireless communication system that can immediately retransmit the data.

Figure 2:
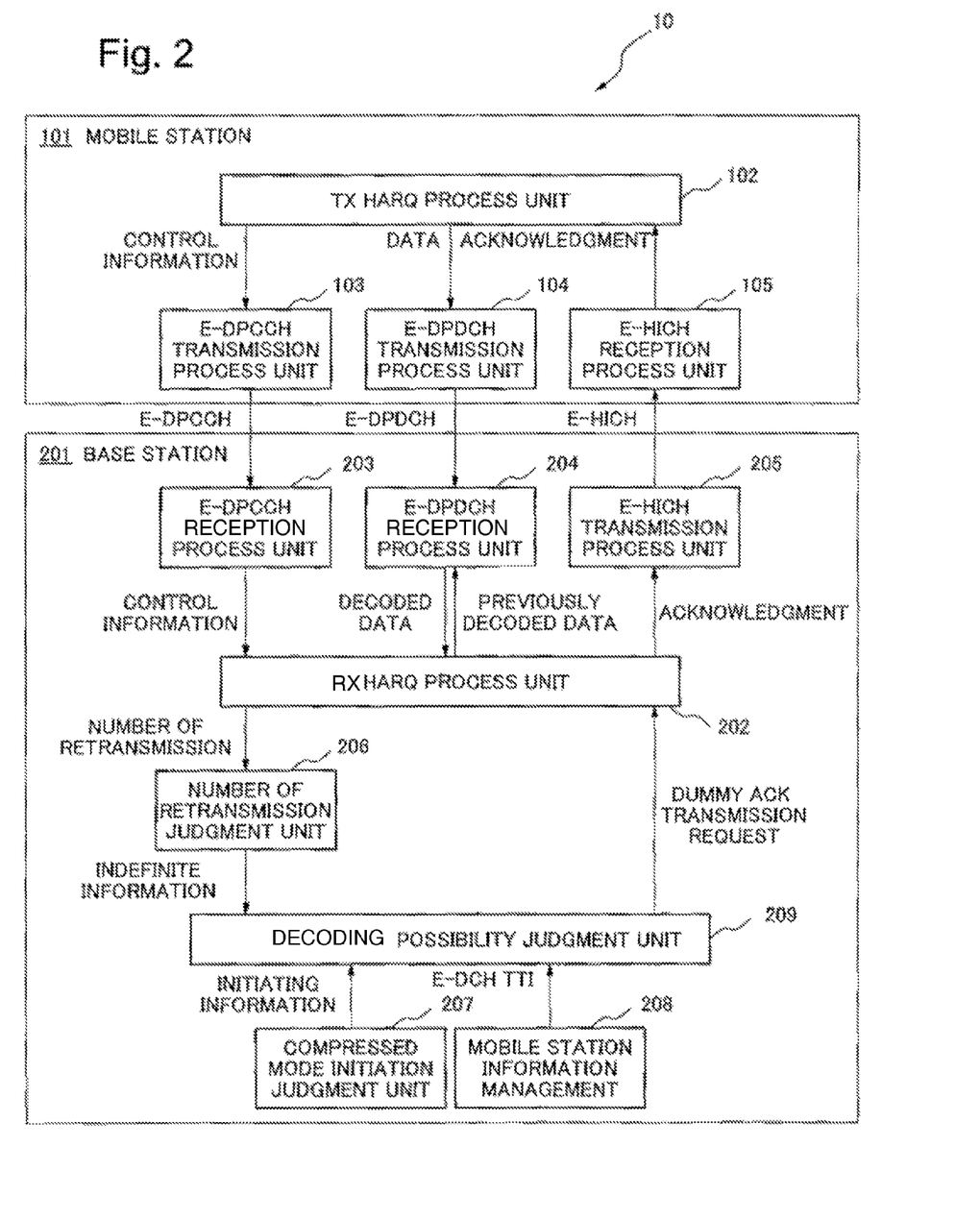
FIG. 2 is a functional block diagram showing a composition of a wireless communication system according to the first embodiment of the present invention.

FIG. 2 is a functional block diagram showing a detailed composition of the wireless communication system 10 according to the first embodiment of the present invention. Further, 101, 103, 104, 105, 201, 203, 204, and 205 in FIG. 2 correspond to 101a, 103a, 104a, 105a, 201a, 203a, 204a, and 205a in FIG. 7 respectively.

The wireless communication system 10 performs wireless communication between the mobile station 101 and the base station 201 by the HSUPA. The mobile station 101 includes a Tx HARQ process unit 102, an E-DPCCH transmission process unit 103, an E-DPDCH transmission process unit 104, and an E-HICH reception process unit 105 (Tx means a Transmitter, and hereinafter referred similarly).

The Tx HARQ process unit 102 receives the acknowledgement from the E-HICH reception process unit 105, generates the control information, and sends it to the E-DPCCH transmission process unit 103, and also sends the communication data to the E-DPDCH transmission process unit 104 after generating it. The E-DPCCH transmission process unit 103 transmits the control information that is received from the Tx HARQ process unit 102 to the base station 201 through the E-DPCCH. The E-DPDCH transmission process unit 104 transmits the data that is received from the Tx HARQ process unit 102 to the base station 201 through the E-DPDCH. The E-HICH reception process unit 105 extracts the acknowledgement from E-HICH which is received from the base station 201 and sends it to the Tx HARQ process unit 102.

In addition, the base station 201 includes a Rx HARQ process unit 202, an E-DPCCH reception process unit 203, an E-DPDCH reception process unit 204, an E-HICH transmission process unit 205, a number of retransmission judgment unit 206, a compressed mode initiation judgment unit 207, a mobile station information management unit 208, and a decoding possibility judgment unit 209 (Rx means a receiver, and hereinafter referred similarly).

The Rx HARQ process unit 202 generates the acknowledgement from other elements and sends it to the E-HICH transmission process unit 205 (detailed description will be made later). The E-DPCCH reception process unit 203 generates the control information from the E-DPCCH which is received from the mobile station 101 and sends it to the Rx HARQ process unit 202. The E-DPDCH reception process unit 204 decodes data from the E-DPDCH that is received from the mobile station 101, and sends to the Rx HARQ process unit 202. The E-HICH transmission process unit 205 transmits the acknowledgement received from the Rx HARQ process unit 202 to the mobile station 101 through the E-HICH.

The number of retransmission judgment unit 206 is notified of number of retransmissions RSN from the Rx HARQ process unit 202, and notifies the decoding possibility judgment unit 209 of the indefinite information when RSN=3. When the base station 201 is initiating at the compressed mode, the compressed mode initiation judgment unit 207 notifies a compressed mode initiating information to the decoding possibility judgment unit 209. The mobile station information management unit 208 notifies the decoding possibility judgment unit 209 of the E-DCH TTI in which the base station 201 is executing. The decoding possibility judgment unit 209 outputs the dummy ACK transmission request to the Rx HARQ process unit 202 when conditions described hereinafter are satisfied (details will be described later).

Further, it is supposed that the mobile station 101 and the base station 201 are controlled by computers respectively, and the operation of each function unit described above and the process of a flow chart described hereinafter can be composed of programs executed by the computers.

Figure 3:
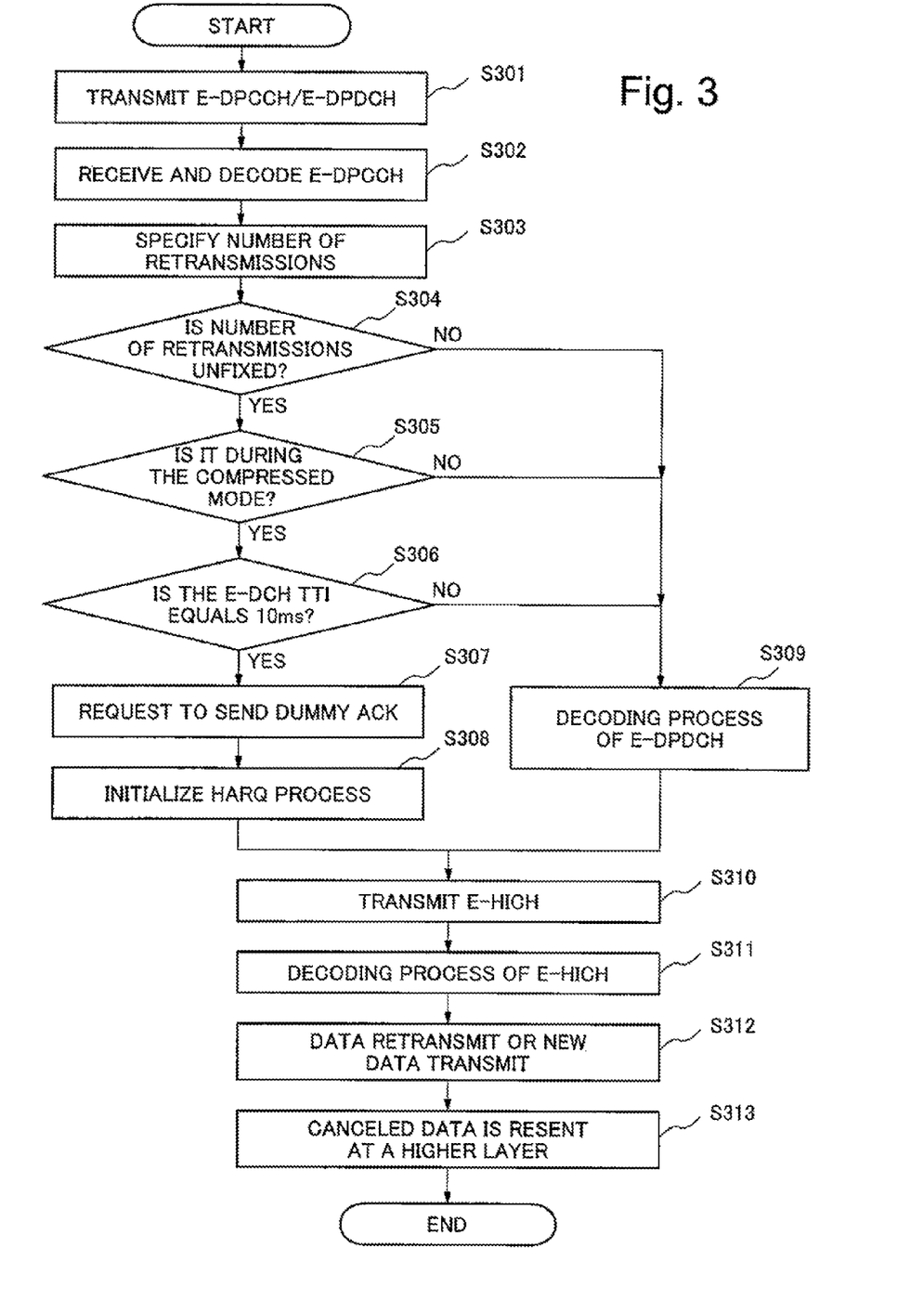
FIG. 3 is a flowchart showing a process flow of the wireless communication system shown in FIG. 2 when communicating from a mobile station to a base station.

FIG. 3 is a flowchart showing a process flow when communicating from the mobile station 101 to the base station 201 in the wireless communication system 10 shown in FIG. 2. First, in the mobile station 101, the control information and the data from the Tx HARQ process unit 102 are encoded by the E-DPCCH transmission process unit 103 and the E-DPDCH transmission process unit 104 respectively, and then transmitted to the base station 201 through the E-DPCCH and the E-DPDCH (Step S301).

In the base station 201, after receiving the E-DPCCH, the E-DPCCH reception process unit 203 decodes the E-DPCCH (Step S302), and notifies the RSN extracted from the control information by the decoding to the Rx HARQ process unit 202. The Rx HARQ process unit 202 specifies number of the retransmissions from the received RSN, and notifies it to the number of retransmission judgment unit 206. Because number of the retransmissions cannot be specified when RS=3 as mentioned above, the number of retransmission judgment unit 206 notifies an indefinite information to the decoding possibility judgment unit 209 when RSN=3 (Step S303).

The decoding possibility judgment unit 209 confirms the indefinite information from the number of retransmission judgment unit 206, the compressed mode initiating information from the compressed mode initiation judgment unit 207, and the E-DCH TTI from the mobile station information management unit 208. Then, the decoding possibility judgment unit 209 judges in sequence "Is number of the retransmissions unfixed?" (Step S304), "Is it during the compressed mode initiating?" (Step S305), and "Does the E-DCH TTI equal to 10 ms?" (Step S306). When answers of all steps S304 to 306 are "YES", it advances to Step S307, and when at least one of them is "NO", it advances to Step S309.

In case of advanced to Step S307 by the assessment of step S304 to 306, the decoding possibility judgment unit 209 requests the Rx HARQ process unit 202 to send a dummy ACK (Step S307). When the Rx HARQ process unit 202 received a transmission request of a dummy ACK, it does not execute the decoding process of the E-DPDCH, initializes the HARQ process, and notifies the dummy ACK as the acknowledgement to the E-HICH transmission process unit 205 (Step S308). And then, it advances to a process of Step S310.

Further, the above-mentioned dummy ACK is explained. Usually, ACK is sent when decoding has been executed normally and the communication has been completed. On the other hand, dummy ACK means transmitted ACK in order to cancel the retransmission process of the data that cannot be processed the decoding and request new transmissions. And dummy ACK itself that is notified to the mobile station 101 is identical with normal ACK.

When advancing to Step S309 according to the decision of steps S304 to 306, the Rx HARQ process unit 202 executes the decoding process of the E-DPDCH. And the Rx HARQ process unit 202 notifies the decoded result (i.e. ACK/NACK/DTX) to the E-HICH transmission process unit 205 as the acknowledgement (Step S309) and advances to a process of Step S310.

The E-HICH transmission process unit 205 encodes E-HICH including the acknowledgement which was notified in Step S308 or S309, and transmits to the mobile station 101 (Step S310). The mobile station 101 executes decoding process of E-HICH in the E-H ICH reception process unit 105, and notifies the decoded acknowledgement to the Tx HARQ process unit 102 (Step S311).

The Tx HARQ process unit 102 retransmits the data to the base station 201 when the notified acknowledgement is NACK/DTX and initializes the HARQ process when it is ACK, and newly transmits when there is a new data to the base station 201 (Step S312).

Even though it notifies the dummy ACK and the data which is not executed the decoding process is to be canceled practically, the canceled data is resent from the beginning at a higher layer (not shown in a diagram). After that, each of the resent data from the Tx HARQ process unit 102 and the control information is encoded by the E-DPCCH transmission process unit 103 and the E-DPDCH transmission process unit 104 respectively, and is transmitted as the E-DPCCH and the E-DPDCH (Step S313).

In this way, according to the embodiment, by the transmission of dummy ACK indicated in Step S308, it can prompt transmission of a new data and suppress a decline of the throughput. Because there is no specific difference between the dummy ACK and a normal ACK as stated above, the mobile station should have only a function of executing a reaction to normal ACK. Accordingly, there is an advantage that it is not necessary to have a specific mechanism in the mobile station in accordance with the embodiment.

Second Embodiment

Figure 4:
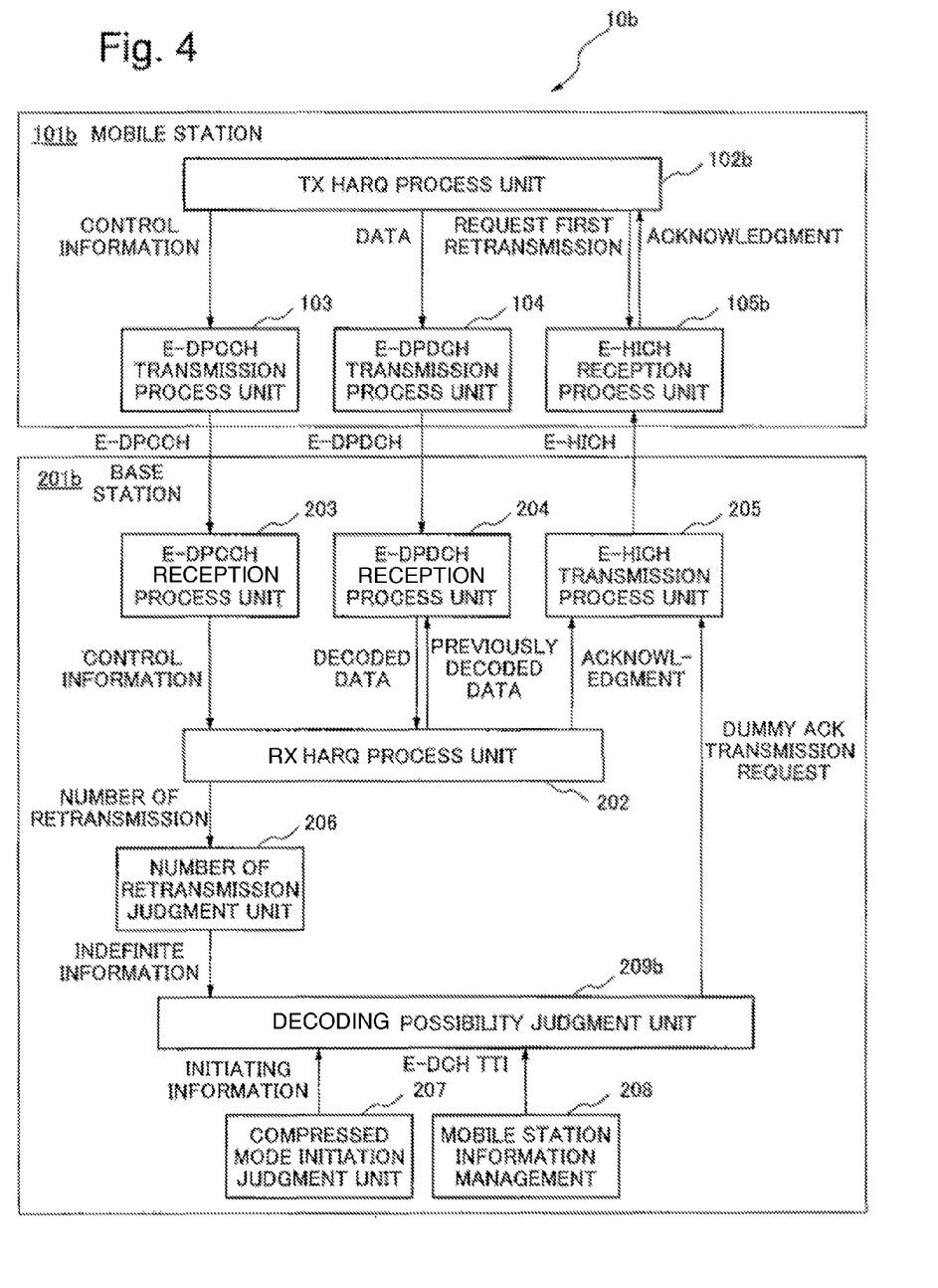
FIG. 4 is a functional block diagram showing a composition of the wireless communication system according to the second and third embodiment of the present invention.
Figure 5:
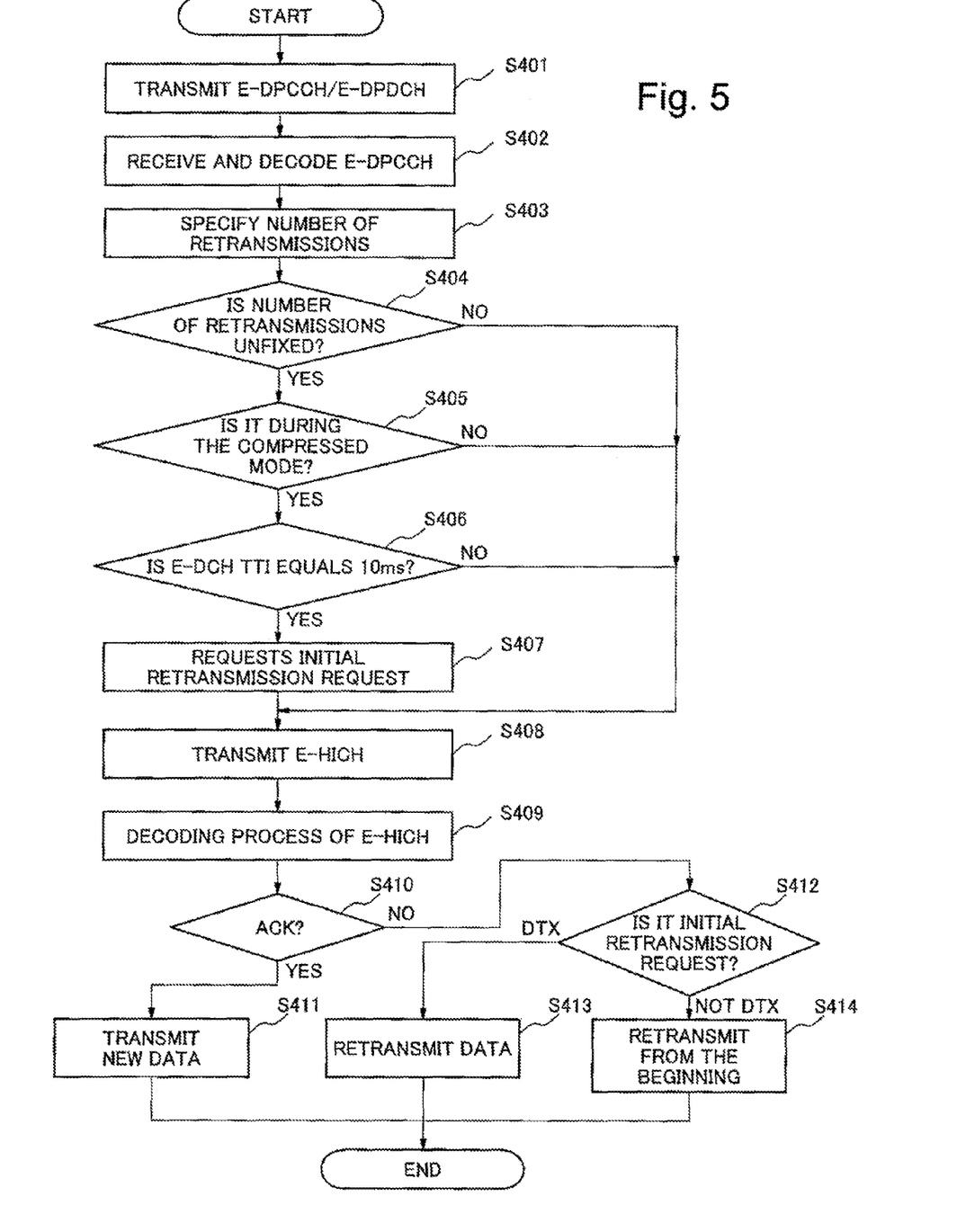
FIG. 5 is a flowchart showing a process flow of the wireless communication system shown in FIG. 4 when communicating from a mobile station to a base station.

FIG. 4 is a functional block diagram showing a composition of a wireless communication system 10b according to the second embodiment of the present invention. FIG. 5 is a flowchart showing a process when communicating from a mobile station 101b to a base station 201b in the wireless communication system 10b shown in FIG. 4. The wireless communication system 10b is performing wireless communication between the mobile station 101b and the base station 201b. Because the mobile station 101b and the base station 201b composed of the elements that has the identical name with the first embodiment, descriptions of these elements are omitted. However, because contents and flows of each process are different from the first embodiment, these points are described as follows.

Initial steps S401 to 403 in the flowchart in FIG. 5 are identical with steps S301 to 303 in FIG. 3. A decoding possibility judgment unit 209b confirms the indefinite information from the number of retransmission judgment unit 206, the compressed mode initiating information from the compressed mode initiation judgment unit 207, and the E-DCH TTI from the mobile station information management unit 208. And the decoding possibility judgment unit 209b assesses in sequence "Is number of the retransmissions unfixed?" (Step S404), "Is it during the compressed mode initiating?" (Step S405), and "Does the E-DCH TTI equal to 10 ms?" (Step S406). When answers of all steps S404 to 406 are "YES", it advances to Step S407, and when at least one of them is "NO", advances to Step S408.

When advancing to Step S407 by the decision of steps S404 to 406, the decoding possibility judgment unit 209b requests the initial retransmission request to the E-HICH transmission process unit 205 (Step S407). The E-HICH transmission process unit 205 encodes the acknowledgement from the Rx HARQ process unit 202 and the initial retransmission request from the decoding possibility judgment unit 209b respectively by using different signature sequence number, and transmits them by the signature multiplex (Step S408). Further, in FIG. 4 and in FIG. 5, in order to show that it is transmitted by the signature multiplex, it is transmitted as E-HICH for convenience in the figure.

The mobile station 101b decodes the received E-HICH at an E-HICH reception process unit 105b, and notifies the acknowledgement and the initial retransmission request obtained by the decoding process to a Tx HARQ process unit 102b (Step S409). The Tx HARQ process unit 102b checks whether the notified acknowledgement is ACK or not (Step S410). When the result of the judgment is ACK, the Tx HARQ process unit 102b initializes the HARQ process and newly transmits when there are new data (Step S411). When the notified acknowledgement in Step S410 is NACK or DTX, it advances to Step S412.

In a case that it advances to Step S412 by the decision of Step S410, the Tx HARQ process unit 102b checks whether the initial retransmission request is DTX or not (Step S412), and if it is DTX, it retransmits the data by the HARQ process (Step S413). On the other hand, when the initial retransmission request is not DTX, it retransmits the HARQ process from the initial transmission (Step S414).

In the first embodiment, by using "dummy ACK" the retransmission process of the data which cannot be decoded are canceled and newly transmission is executed. In contrast, according to the second embodiment, it retransmits immediately the data which cannot be decoded as the new data by using "initial retransmission request". As a result, according to the second embodiment, because it does not need to wait for the retransmission from the higher layers as shown in Step S313 of FIG. 3, it can further decrease the delay.

Third Embodiment

A composition of the wireless communication system according to the third embodiment of the present invention is identical with the composition of the wireless communication system 10b according to the second embodiment described in FIG. 4. In addition, general processes that the wireless communication system executes are identical with the flowchart shown in FIG. 5. The different points between the third embodiment and the second embodiment of the present invention are only on the details of the operation of steps S408 to 409 shown in FIG. 5.

In Step S408 of the second embodiment, the E-HICH transmission process unit 205 encodes the acknowledgement from the Rx HARQ process unit 202 and the initial retransmission request from the decoding possibility judgment unit 209b respectively by using a different signature sequence number and transmits by the signature multiplex. In contrast, according to the third embodiment, the E-HICH transmission process unit 205 encodes the acknowledgement from the Rx HARQ process unit 202 and the initial retransmission request from the decoding possibility judgment unit 209b respectively by using an identical signature sequence number and transmits by time multiplex.

Figure 6:
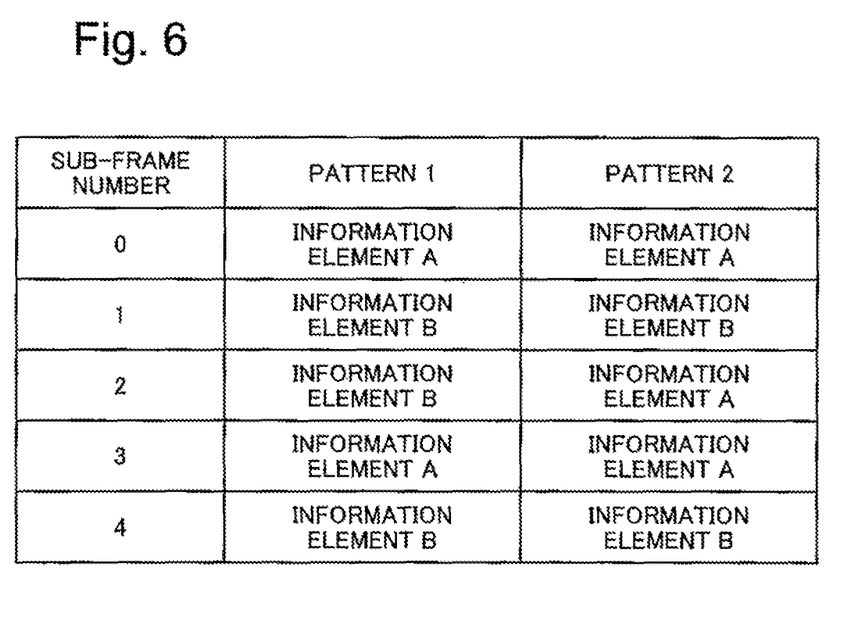
FIG. 6 is a table showing an example of a time multiplex mapping pattern of an E-HICH when the TTI equals 10 ms according to the third embodiment of the present invention.

FIG. 6 is a table showing an example of a time multiple mapping pattern of an E-HICH when TTI equals 10 ms. Because the largest GAP length per 10 ms equals 7 time slots, when the mapping is either pattern 1 or pattern 2 shown in FIG. 6, it is certain to include and transmit two information elements indicated as the information elements A and B for any kinds of GAP pattern. These information elements A and B may include the acknowledgement and the initial retransmission request.

In the mobile station 101b, common mode addition of the received E-HICH is executed for the information element A/B separately according to the pattern that is designated by the E-HICH reception process unit 105b. Then, it executes decoding respectively, and notifies to the Tx HARQ process unit 102b of the acknowledgement and the initial retransmission request obtained by the decoding process (Step S409).

According to the third embodiment, since the data which cannot be decoded can be immediately retransmitted as the new data by "initial retransmission request", the identical result with the second embodiment can be obtained.

Although the communication system of the up link has been exemplified according to the above-mentioned embodiments, the invention of the present application is not limited to those. For example, by replacing "When it cannot specify number of the retransmissions" with "When it cannot specify information required for the decoding" in the communication system of the up link, generality can be improved so that it can be applied to a down link system.

While having described an invention of the present application referring to the embodiments shown in the drawings, the invention of the present application is not limited to the above-mentioned embodiments shown in the drawings. It is to be understood that to the configurations and details of the invention of the present application, various configurations can be made within the scope of the invention.

The invention claimed is:

1. A base station performing wireless communication with the mobile station, comprising:
    a first reception unit for receiving predetermined data from said mobile station through a first physical channel;
    a transmission unit for decoding said data in the physical layer and transmitting said decoded result through a second physical channel;
    a second reception unit for receiving first control information generated based on said decoded result through a third physical channel, wherein said transmission unit transmits second control information through said second physical channel to said mobile station in order to retransmit the data from the beginning in a case when it cannot specify a number of retransmissions from the first control information; and
    a judgment unit that checks whether the following retransmission control conditions are satisfied:
    Retransmission Sequence Number (RSN) that is included in said first control information equals 3;
    a compressed mode is under operation; and
    Transmission Time Interval (TTI) equals 10 ms, wherein said transmission unit executes said retransmission control when said retransmission control conditions are satisfied, and
    wherein said first physical channel is an Enhanced Dedicated Physical Data Channel (E-DPDCH), said second physical channel is an E-DCH Hybrid ARQ Indicator Channel (E-HICH), and said third physical channel is an Enhanced Dedicated Physical Control Channel (E-DPCCH).

2. The base station according to claim 1, wherein
said transmission unit transmits ACK without executing the decoding process when said retransmission control conditions are satisfied.

3. The base station according to claim 1, wherein
said judgment unit requests said transmission unit to transmit the initial retransmission request when said retransmission control conditions are satisfied.

4. The base station according to claim 3, wherein
said base station has a Rx HARQ (Hybrid Automatic Repeat Request) process unit which generates the acknowledgement based on said decoded result, and wherein
said transmission unit encodes said acknowledgement and said initial retransmission request respectively by using a different signature sequence number and transmits by the signature multiplex.

5. The base station according to claim 3, wherein
said base station has the Rx HARQ (Hybrid Automatic Repeat Request) process unit which generates the acknowledgement based on said decoded result, and wherein
said transmission unit encodes said acknowledgement and said initial retransmission request respectively by using an identical signature sequence number and transmits by the time multiplex.

6. A retransmission control method for wireless communication between a mobile station and a base station, comprising the steps of:
making said mobile station transmit the data through the first physical channel (a first transmitting step);
making said base station receive said data (a first receiving step);
making said base station decode said data in the physical layer and transmit said decoded result through the second physical channel (a second transmitting step);
making said mobile station receive the decoded result through the second physical channel (a second receiving step);
making said mobile station generate the first control information based on said decoded result and transmit said first control information through the third physical channel (a third transmitting step);
making said base station receive said first control information through said third physical channel (a third receiving step);
making said base station check whether the following retransmission control conditions are satisfied:
Retransmission Sequence Number (RSN) that is included in said first control information equals 3;
a compressed mode is under operation; and
Transmission Time Interval (TTI) equals 10 ms;
making said base station transmit second control information through said second physical channel to said mobile station in order to retransmit the data from the beginning in a case when it cannot specify number of the retransmissions from the first control information (a fourth transmitting step); and
making said mobile station receive said second control information through said second physical channel (a fourth receiving step), wherein
said fourth transmitting step executes said retransmission control when said retransmission control conditions are satisfied, and
wherein said first physical channel is an Enhanced Dedicated Physical Data Channel (E-DPDCH), said second physical channel is an E-DCH Hybrid ARQ Indicator Channel (E-HICH), and said third physical channel is an Enhanced Dedicated Physical Control Channel (E-DPCCH).

7. The retransmission control method according to claim 6, wherein
said fourth transmitting step transmits ACK without executing the decoding process when said retransmission control conditions are satisfied.

8. The retransmission control method according to claim 6, wherein
said fourth transmitting step dictates to transmit the initial retransmission request when said retransmission control conditions are satisfied.

9. The retransmission control method according to claim 8, further comprising a step of
making said mobile station retransmit said data from the initial transmission when receiving said initial retransmission request (a fifth transmitting step).

10. The retransmission control method according to claim 8, further comprising a step of
making said base station generate the acknowledgement based on the decoded result of said data, wherein
said fourth transmitting step encodes said acknowledgement and said initial retransmission request respectively by using a different signature sequence number and transmits by the signature multiplex.

11. The retransmission control method according to claim 8, further comprising a step of
making said base station generate the acknowledgement based on the decoded result of said data, wherein
said fourth transmitting step encodes said acknowledgement and said initial retransmission request respectively by using an identical signature sequence number and transmits by the time multiplex.

* * * * *